United States Patent
Millman

(10) Patent No.: US 7,373,539 B2
(45) Date of Patent: May 13, 2008

(54) PARALLEL PATH ALIGNMENT METHOD AND APPARATUS

(75) Inventor: Steven D. Millman, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 499 days.

(21) Appl. No.: 11/047,293

(22) Filed: Jan. 31, 2005

(65) Prior Publication Data

US 2006/0174152 A1 Aug. 3, 2006

(51) Int. Cl.
*G06F 1/04* (2006.01)
(52) U.S. Cl. ...................... 713/500; 365/233
(58) Field of Classification Search ................ 713/500; 365/233
See application file for complete search history.

(56) References Cited

U.S. PATENT DOCUMENTS 6,898,722 B2 * 5/2005 Anzai ......................... 713/500

2003/0046618 A1 3/2003 Collins

OTHER PUBLICATIONS

Lammers, David; "RapidIO gains chip support, legitimacy"; EETimes; Apr. 3, 2003; 4 pages; EETimes.
Bouvier, Dan; "The Embedded System Interconnect"; RapidIO: The Interconnect Architecture for High Performance Embedded Systems; Jan. 3, 2003; pp. 1-20 (plus cover and end pages); www.rapidio.org.

* cited by examiner

*Primary Examiner*—Chun Cao
*Assistant Examiner*—Albert Wang
(74) *Attorney, Agent, or Firm*—Michael J. Balconi-Lamica

(57) ABSTRACT

A method for aligning parallel path data bit streams that may contain skewed data between bit streams and an integrated circuit are disclosed. The method includes, for each bit stream, sampling P data presented on a positive edge of a clock, sampling N data presented on a negative edge of the clock, and delaying the sampled P and N data by one of zero, one-half, one, or other multiple of one-half clock cycle. Delaying the sampled P and N data by one of zero, one-half, one, or other multiple of one-half clock cycle is selected to remove any skew and aligns the sampled P and N data between bit streams.

15 Claims, 8 Drawing Sheets

PARALLEL PATH ALIGNMENT METHOD AND APPARATUS

BACKGROUND

The present disclosure generally relates to high speed parallel data streams and, more particularly, to a parallel path alignment method and apparatus.

RELATED ART

RapidIO is a new high-speed interconnect standard. High-speed parallel buses have very tight skew requirements. These requirements place a significant burden on board designers to ensure that the skew budgets are not violated. In addition, chip designers must also be extremely careful with skew to allow circuit board designers the maximum amount of skew budget. For example, RapidIO requires that the skew for eight (8) data bits and a frame bit be no more than plus or minus 200 picoseconds (ps) out of a 1000 ps period. Furthermore, within the 400 picosecond range (corresponding to ±200 picoseconds), no pair of signals can be more than 300 picoseconds apart. In other words, if one signal is 200 picoseconds early, the latest any other signal could be is 100 picoseconds late. With high-speed parallel buses, multiple data bits and a clock are typically being received. Accordingly, the high-speed parallel buses have to be able to align the data bits such that all of the bits can be presented in the correct byte on the correct edge of the clock.

One example of an alignment method is to line up data properly with a clock signal extracted from the data itself. If the data is ten bits long, and the alignment can vary by up to two bits, then a twelve bit shift register can be used. This corresponds to a serial interface and 1, 2, or 3 bits can come in on each clock. In addition, control logic determines how much to shift each time. Alignment logic is then used to determine where the desired 10-bit word is within the 12-bit register. As a result, a 3-to-1 multiplexor is required to determine the value of each of the 10 output bits.

Given that the immediately preceding paragraph is for a serial interface, using a similar methodology, a 9-bit parallel interface would require a 3-to-1 multiplexor for each of four bit positions for each of 9 bits, resulting in 36 multiplexors. Note also that the later multiplexors are in addition to the multiplexors required to create the shift register. The basic idea here is that as the data stream moves through the shift register, you determine where the next word is located and set the multiplexors to sample that word properly. A 3-to-1 multiplexor is needed for each output bit as each bit could come from one of three positions. For example, bit 0 could come from bit positions 0, 1, or 2. A disadvantage of this methodology is that it puts the alignment multiplexors in the output path, which is often a critical path, furthermore, using large multiplexors. In addition, the above-mentioned methodology is not easily extendible to handle larger skew tolerances.

FIG. 1 is a schematic diagram view of a parallel double data rate (DDR) alignment circuit for a receiver core according to the prior art. Circuit 100 receives inputs 102 and 104, corresponding to N Data and P Data respectively. The N Data includes data received on the negative edge of the clock. The P Data includes data received on the positive edge of the clock. The alignment circuit comprises six flip-flops (108, 110, 112, 114, 116, and 118) coupled to four (3-to-1) multiplexors (120, 122, 124, and 126). Flip-flops F0 and F1 correspond to sample flip-flops, whereas flip-flops F2, F3, F4 and F5 correspond to alignment flip-flops. All together, flip-flops F0-F5 are used for accumulating four bits.

SCLK represents the endpoint state clock for a Digital Locked Loop (DLL). In general, DDR data is received every one-half clock cycle, corresponding to either of the negative and positive edges of a clock signal, represented by SCLK_B (140) and SCLK (138), respectively. Bits are presented on an output of the aligner circuit to a core in a given order (i.e., Bit0 (130), Bit1 (132), Bit2 (134), and Bit3 (136)). The outputs of the flip-flops are input to various ones of 3-to-1 multiplexors (120, 122, 124, and 126), as shown. Alignment is accomplished via select input SEL[0:1] (128), for selecting whether the alignment delay is zero (0) (top mux inputs), one half (½) (middle mux inputs), or a full (bottom mux inputs) clock cycle.

FIG. 2 is a timing diagram view of various signals of the parallel double data rate alignment circuit of FIG. 1. The timing diagram view 200 includes representative data on a respective one of the listed SCLK, N Data, P Data, and flip-flop F0-F5 outputs. The bit stream is P0, N0, P1, N1, P2, N2, etc. In other words, the bit received first is P0. In connection with circuit 100 of FIG. 1, delays of zero (0), one half (½), and one (1) full cycle are possible.

For no extra delay, the outputs of MUXs 120-126 would be driven by flip-flops F0, F1, F2 and F3, indicated by reference numerals 108, 110, 112 and 114, respectively. That is, on every other clock cycle of SCLK, the four bits are sampled. In the wave diagram 200 of FIG. 2, the first outputs from the flip-flops would be available after the second rising edge of the clock at 202, corresponding to P0, N0, P1, and N1. In addition, after the fourth rising edge of the clock SCLK at 204, the next four bits P2, N2, P3, and N3 would be ready.

In order to delay a bit by one clock cycle (because it arrives a full clock cycle earlier than another bit with which it must be aligned), the MUX outputs would be driven by flip-flops F2, F3, F4 and F5, indicated by reference numerals 112, 114, 116 and 118, respectively. Note that, compared to a bit slice where there is no delay, flip-flops F2, F3, F4 and F5 produce bits delayed by one clock cycle, corresponding to P1, N1, P2, N2.

In order to delay a bit for one-half (½) clock cycle, the MUX outputs would be driven by flip-flops F1, F2, F3 and F4, indicated by reference numerals 110, 112, 114 and 116. Accordingly, this produces bits delayed one-half clock, corresponding to N1, P2, N2 and P3.

However, a disadvantage of the circuit 100 is that alignment occurs within the critical data path, after the multiplexing using MUXs 120, 122, 124, and 126.

Accordingly, it would be desirable to provide an improved method for parallel path alignment in high speed parallel data streams for overcoming the problems in the art.

BRIEF DESCRIPTION OF THE DRAWINGS

The embodiments of the present disclosure are illustrated by way of example and not limited by the accompanying figures, in which like references indicate similar elements, and in which.

Figure 1:
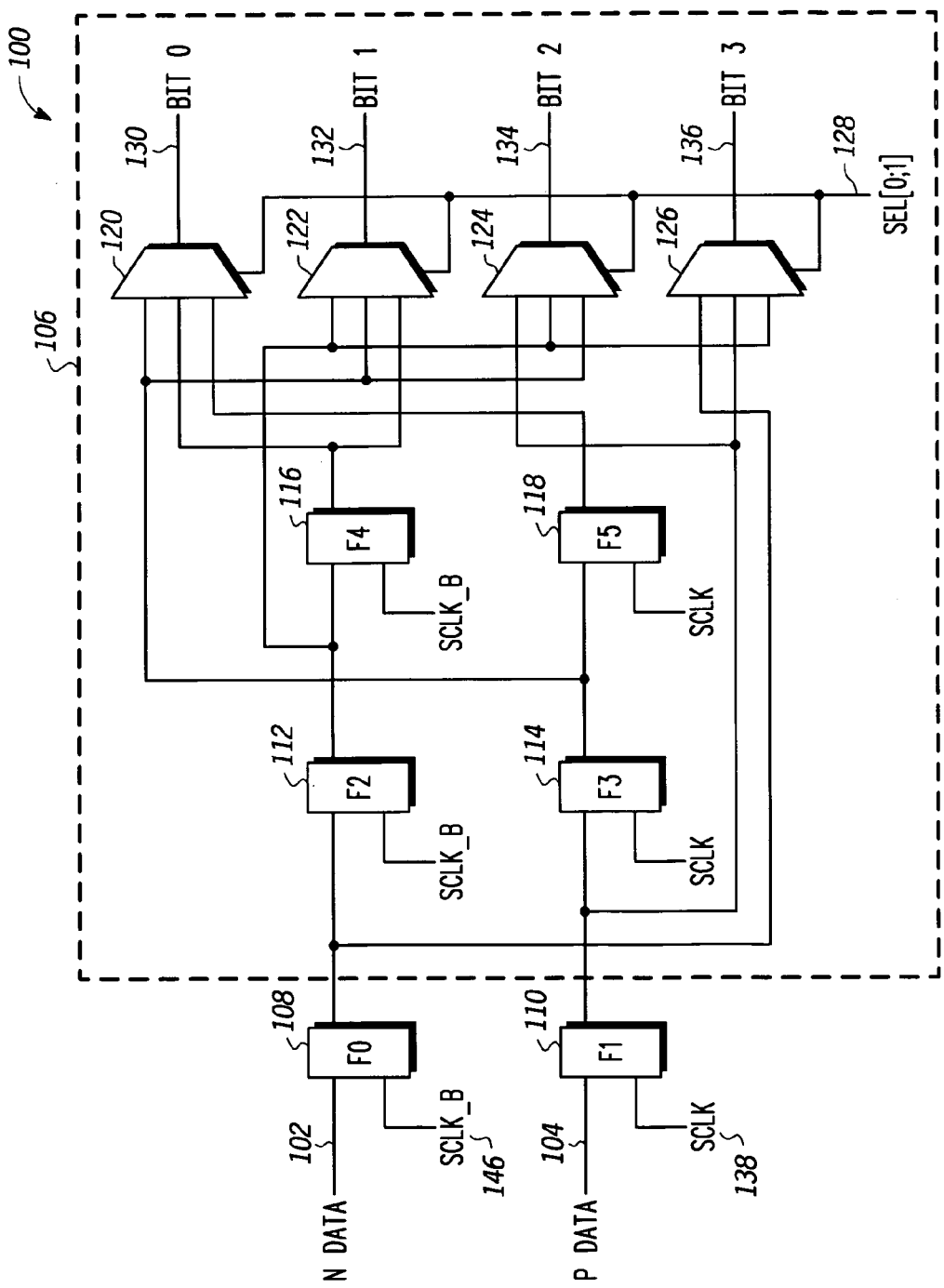
FIG. 1 is a schematic diagram view of a parallel double data rate alignment circuit according to the prior art.
Figure 2:
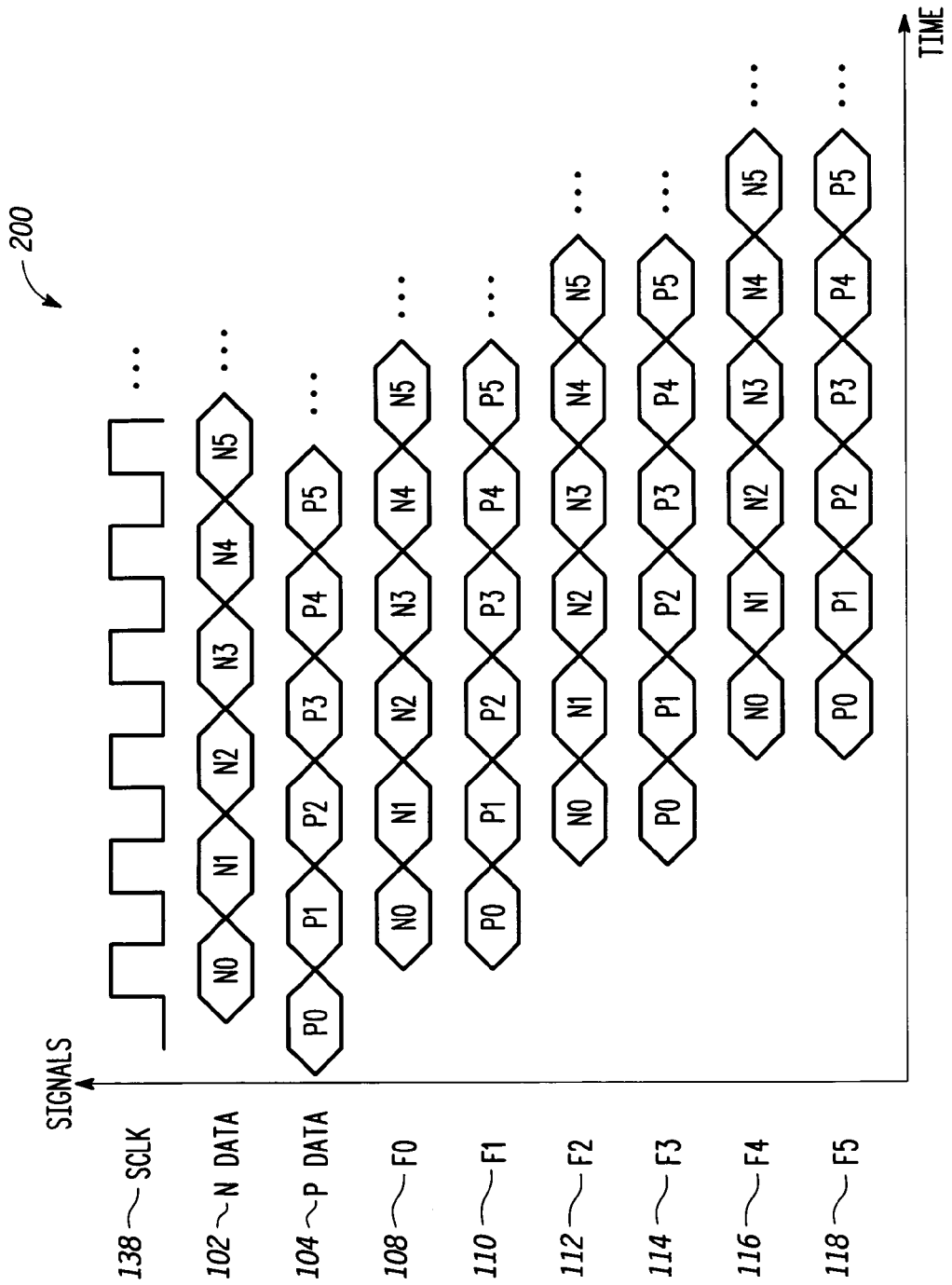
FIG. 2 is a timing diagram view of various signals of the parallel double data rate alignment circuit of FIG. 1.

The use of the same reference symbols in different drawings indicates similar or identical items. Skilled artisans will also appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

According to the embodiments of the present disclosure, the parallel path alignment method and apparatus operate such that once an alignment is determined, the alignment is kept fixed. In addition, the embodiments of the present disclosure are less complex than prior known designs. In one embodiment, the architecture of the present disclosure eliminates a requirement for a large shift register as required in the prior known design. In addition, two-to-one (2-to-1) multiplexors are used instead of the 3-to-1 multiplexors of the prior design, wherein 2-to-1 multiplexors are located outside a critical path. With the prior known design, the 3-to-1 multiplexors occur in the critical path.

In one embodiment of the present disclosure, one or more flip-flop is used to delay data as may be needed for achieving a particular parallel path alignment. The delayed data is then parallel loaded by a set of registers. When that set of registers is full, a word is transferred out. In other words, the one or more flip-flop is used to delay the data either 0, ½, or 1 clock cycle. This can be accomplished using four 2-to-1 multiplexors that allow the data to cross between clock edges. In connection with a double-data rate design, exactly one data bit arrives per clock edge on each of the data lines. Once all of the parallel data bits have been delayed properly, the delay outputs can be loaded, in parallel, into an output register.

In the parallel alignment method and apparatus according to the embodiments of the present disclosure, data bits come on both edges of an endpoint clock. Similarly, as discussed above, the data sampled with the positive edge is called P Data and the data sampled with the negative edge is called N Data. In one embodiment, after being received, four output bits (Bit 0, Bit 1, Bit 2 and Bit 3) then go into some combinational logic which is a critical path. The alignment logic functions to align the various bits so that all of the bits that belong together are presented together at the alignment method and apparatus output on the same clock, even if the bits arrived with significant relative skew.

For simplicity of discussion of the embodiments of the present disclosure, only one bit slice is illustrated. In one real-world implementation of a parallel I/O endpoint, however, nine (9) such circuits would be required. The outputs of such circuits are compared and respective circuit controls adjusted until all nine (9) bit streams are properly aligned.

Various advantages are obtained with the embodiments of the present disclosure. According to one embodiment, the method requires no alignment logic after the output flip-flops. As a result, the critical paths driven by the output bits are much easier to handle.

The multiplexors (muxes) in the method according to the embodiments of the present disclosure appear in a location where there are no critical timing issues. That is, no additional logic is required, for example, for traversing the chip. With the alignment circuit of FIG. 3, it is advantageous to have the muxes (308, 310, 316, 318) in the circuit as shown because there can exist a change in the root of the clock driving the two left-most flip-flops (312, 314) which are on "clean" power and the root of the clock driving the four right-most flip-flops (320, 322, 324, 326) which are on general "core" power. As the four flip-flops (320, 322, 324, 326) on the right are part of a bigger tree, having extra delay between the first two flip-flops (312, 314) and the last four flip-flops (320, 322, 324, 326) can actually help.

Note that the final four flip-flops (320, 322, 324, 326) in the method according to the embodiments of the present disclosure switch at half the frequency as the corresponding ones of the flip-flops in the prior known method. Furthermore, the first two flip-flops (312, 314) in the new method could also be provided with enable inputs so that the flip-flops don't operate at all when H=F=0 (i.e, when neither a half-clock or a full-clock delay is required).

Figure 3:
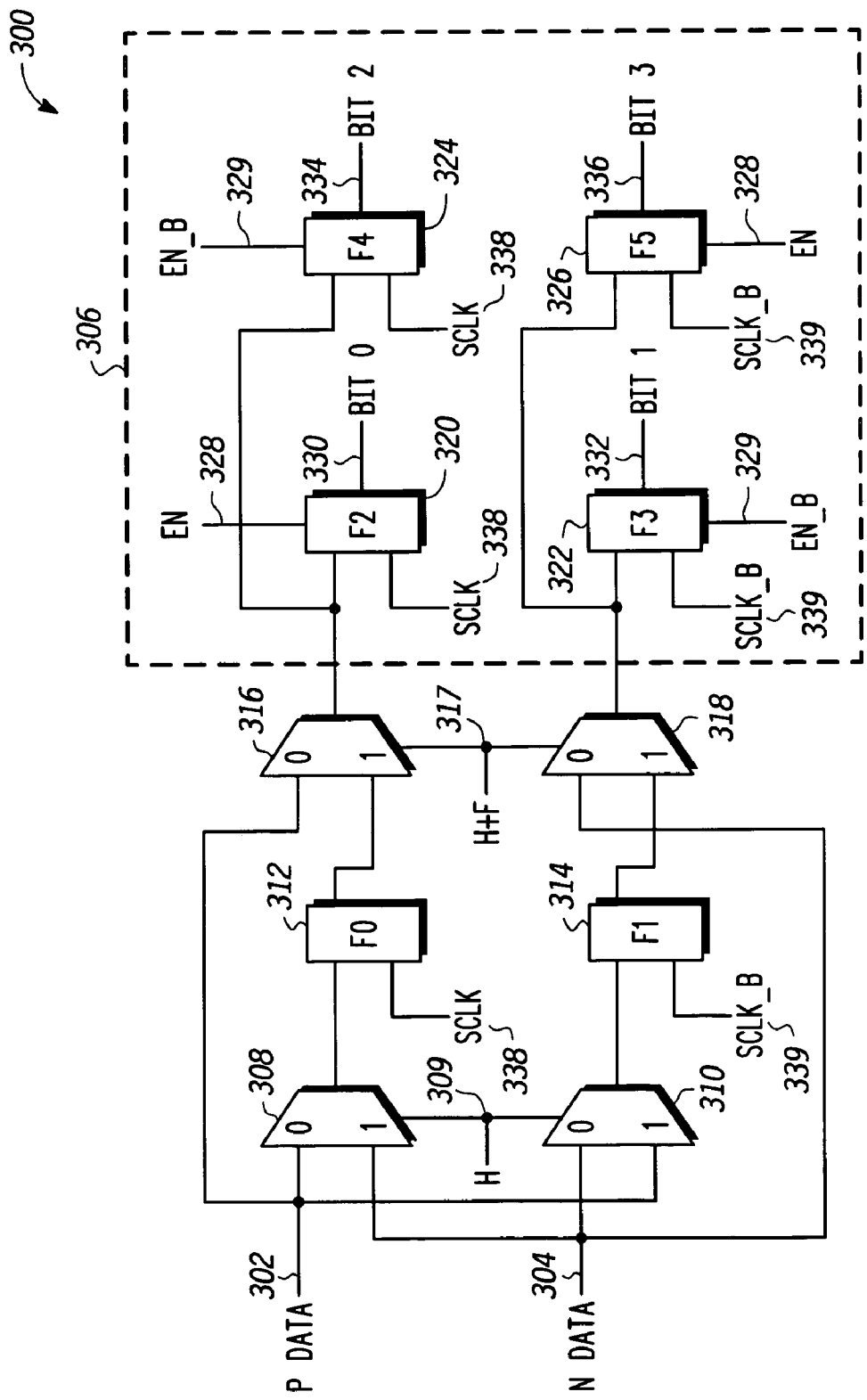
FIG. 3 is a schematic diagram view of a parallel double data rate alignment circuit according to one embodiment of the present disclosure.

FIG. 3 is a schematic diagram view of a parallel double data rate alignment circuit 300 according to one embodiment of the present disclosure. Circuit 300 receives inputs 302 and 304, corresponding to P Data and N Data respectively. The alignment circuit 300 comprises six flip-flops (312, 314, 320, 322, 324, and 326) and four (2-to-1) multiplexors (308, 310, 316, and 318), coupled together as shown. Flip-flops F0 and F1 correspond to delay flip-flops, whereas flip-flops F2, F3, F4 and F5 correspond to register flip-flops. All together, flip-flops F0-F5 are used for accumulating four bits.

Figure 4:
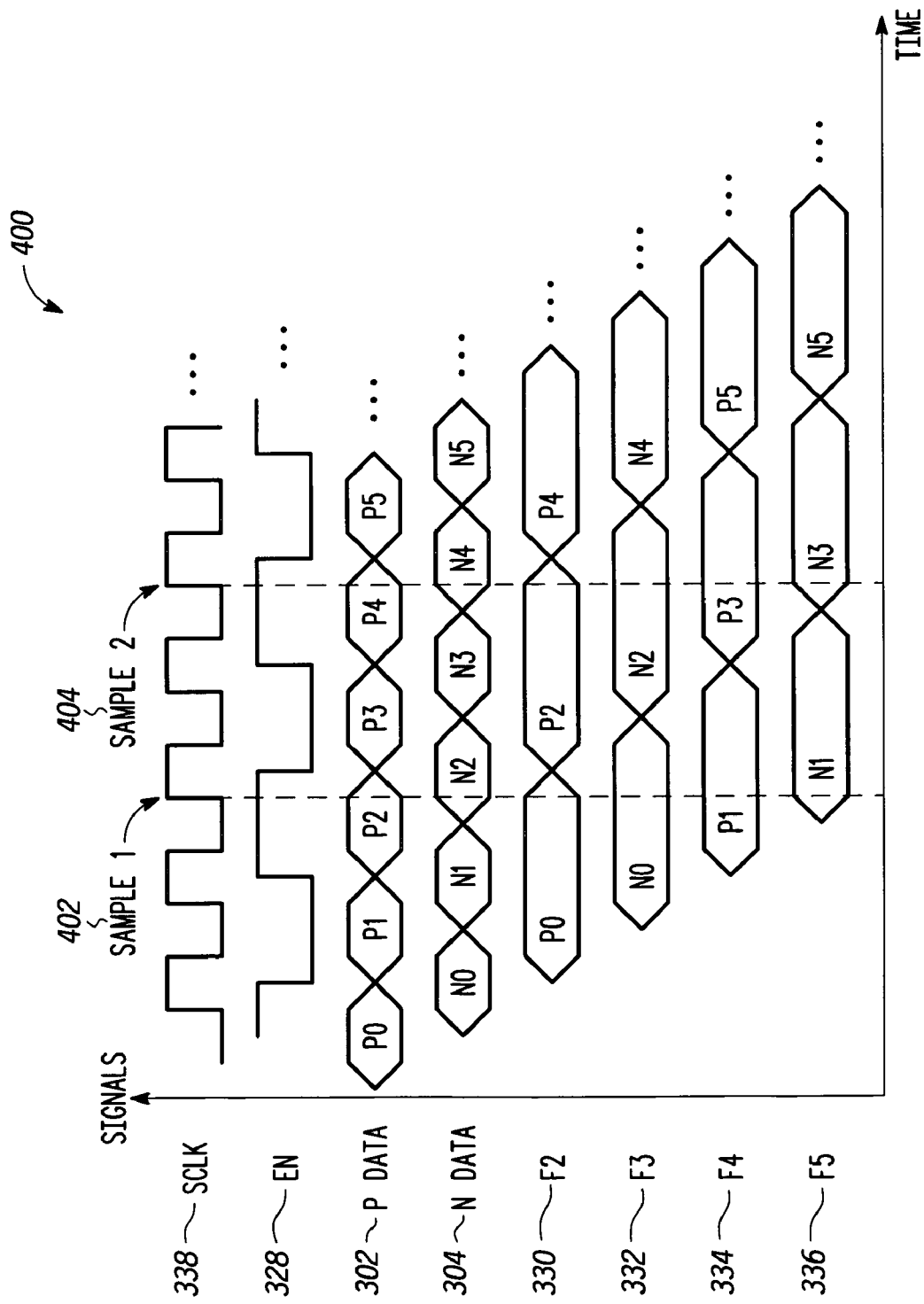
FIG. 4 is a timing diagram view of various signals of the parallel double data rate alignment circuit of FIG. 3, wherein neither a half clock cycle delay nor a full clock cycle delay are asserted according to one embodiment of the present disclosure.

SCLK represents the endpoint state clock for a Digital Locked Loop (DLL). SCLK_B represents the inverse of SCLK. In general, DDR data is received every one-half clock cycle, corresponding to either of the positive and negative edges of a clock signal, represented by SCLK (338) and SCLK_B (339), respectively. The P Data includes data received on the positive edge of the clock. The N Data includes data received on the negative edge of the clock. In the embodiment of FIGS. 3 and 4, the bit stream is P0, N0, P1, N1, P2, N2, etc., wherein the first bit received is P0. Aligned bits are presented on the output of the alignment circuit to a core in a prescribed order (i.e., Bit0 (330), Bit1 (332), Bit2 (334), and Bit3 (336)). Control parameters include H and F. H asserted means delay one-half clock cycle. F asserted means delay one-full clock cycle. Note however that in one embodiment that requires only zero (0), one-half (½) and one (1) clock cycle of delay, H and F are never both be asserted and are mutually exclusive of one another. It is further noted that the handling of additional clock periods of skew is also possible, as may be required for a particular parallel path alignment implementation. For example, a one-and-a-half (1.5), two (2) or other clock skew tolerance could be provided, if required. In addition, EN and EN_B are used to control whether a flip-flop loads new data or maintains its current data. EN is clocked by SCLK. EN_B is EN inverted. Furthermore, delay is controlled via a combination of H, F, EN and EN_B.

FIG. 4 is a timing diagram view of various signals of the parallel double data rate alignment circuit of FIG. 3, in which no additional delay is needed according to one embodiment of the present disclosure. In this situation, neither (i) a half clock cycle delay nor (ii) a full clock cycle delay is asserted. In other words, FIG. 4 shows a set of waveforms 400 for the condition H=F=0, which corresponds to no delay. Accordingly, the contents of flip-flops F0 (312) and F1 (314) are not used. Instead, the outputs of flip-flops F2-F5 (320, 322, 324, 326) are sampled on the rising edges of the clock as indicated. Furthermore, the first sample is {P0,N0,P1,N1} and the second sample is {P2,N2,P3,N3}, further in conjunction with EN (328) and EN_B (329) inputs.

Figure 5:
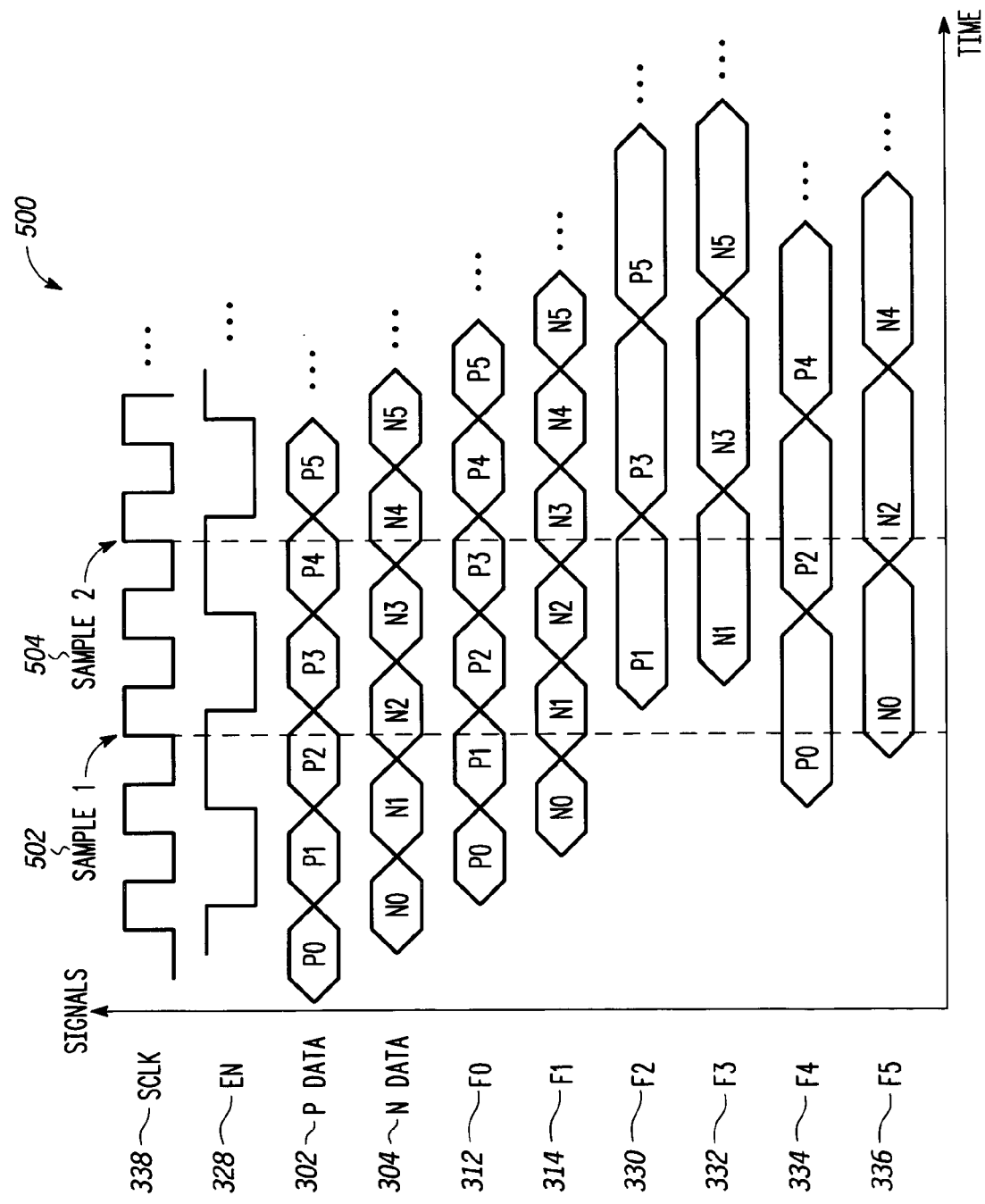
FIG. 5 is a timing diagram view of various signals of the parallel double data rate alignment circuit of FIG. 3, wherein a half clock cycle delay is not asserted and a full clock cycle delay is asserted according to another embodiment of the present disclosure.

FIG. 5 is a timing diagram view of various signals of the parallel double data rate alignment circuit of FIG. 3 in which a full clock cycle delay is asserted according to another embodiment of the present disclosure. In this situation, a half clock cycle delay is not asserted. In other words, FIG. 5 shows a set of waveforms 500 for the condition H=0, F=1, that is, delay one full clock cycle. The delay of a full clock cycle would be used for a bit that arrives one cycle earlier than one or more other signals. That way, the early bit is "slowed down" in order to be properly aligned with other bits. Note that the enable (EN) signal 328 is aligned differently to the arrival of the data signals at flip-flops F2-F5 (320, 322, 324, 326), resulting in the flip-flops being loaded with different values than in the prior example of FIG. 4. With the samples taken in the same locations as in FIG. 4, the first sample 502 includes {Prior P value, Prior N value, P0, N0} and the second sample 504 is {P1,N1,P2,N2}. That is, the samples here are all shifted one cycle later in time to compensate for their arrival one clock cycle earlier. Another way to think of this is to consider that the P0 bit arrives at the samplers in FIG. 4 and FIG. 5 at the same time. However, the P0 bit in FIG. 5 belongs to the same byte as the P1 bit in FIG. 4. Hence, the P0 bit in FIG. 5 is delayed by one clock cycle so that it appears in the same bit position as P1 in FIG. 4 when the first sample 502 is taken.

Figure 6:
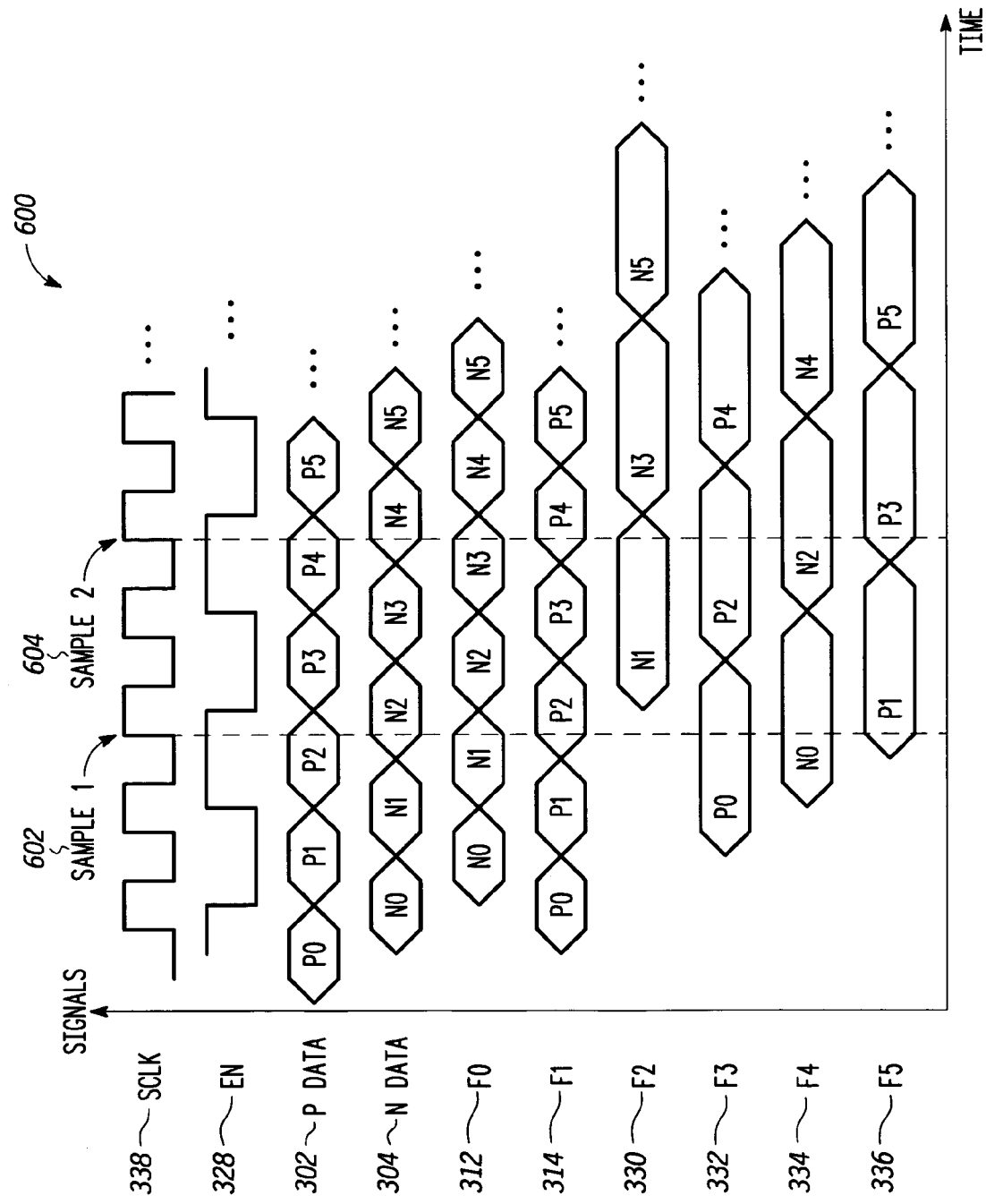
FIG. 6 is a timing diagram view of various signals of the parallel double data rate alignment circuit of FIG. 3, wherein a half clock cycle delay is asserted and a full clock cycle delay is not asserted according to another embodiment of the present disclosure.

FIG. 6 is a timing diagram view of various signals of the parallel double data rate alignment circuit of FIG. 3 in which a half clock cycle delay is asserted according to another embodiment of the present disclosure. In this situation, a full clock cycle delay is not asserted. In other words, FIG. 6 shows a set of waveforms 600 for the condition H=1, F=0, that is, delay half a clock cycle. This situation is similar to that shown in FIG. 5 except that the delay is only one half-cycle rather than a full-cycle. Note that this means the locations of the N bits and P bits are swapped. Accordingly, the first sample 602 is {Prior N value, P0, N0, P1} and the second sample 604 is {N1,P2,N2,P3}. This delay compensates for the data arriving half a cycle early. Hence, this configuration delays each of the data bits one bit position relative to the same numbered bits in FIG. 4.

Figure 7:
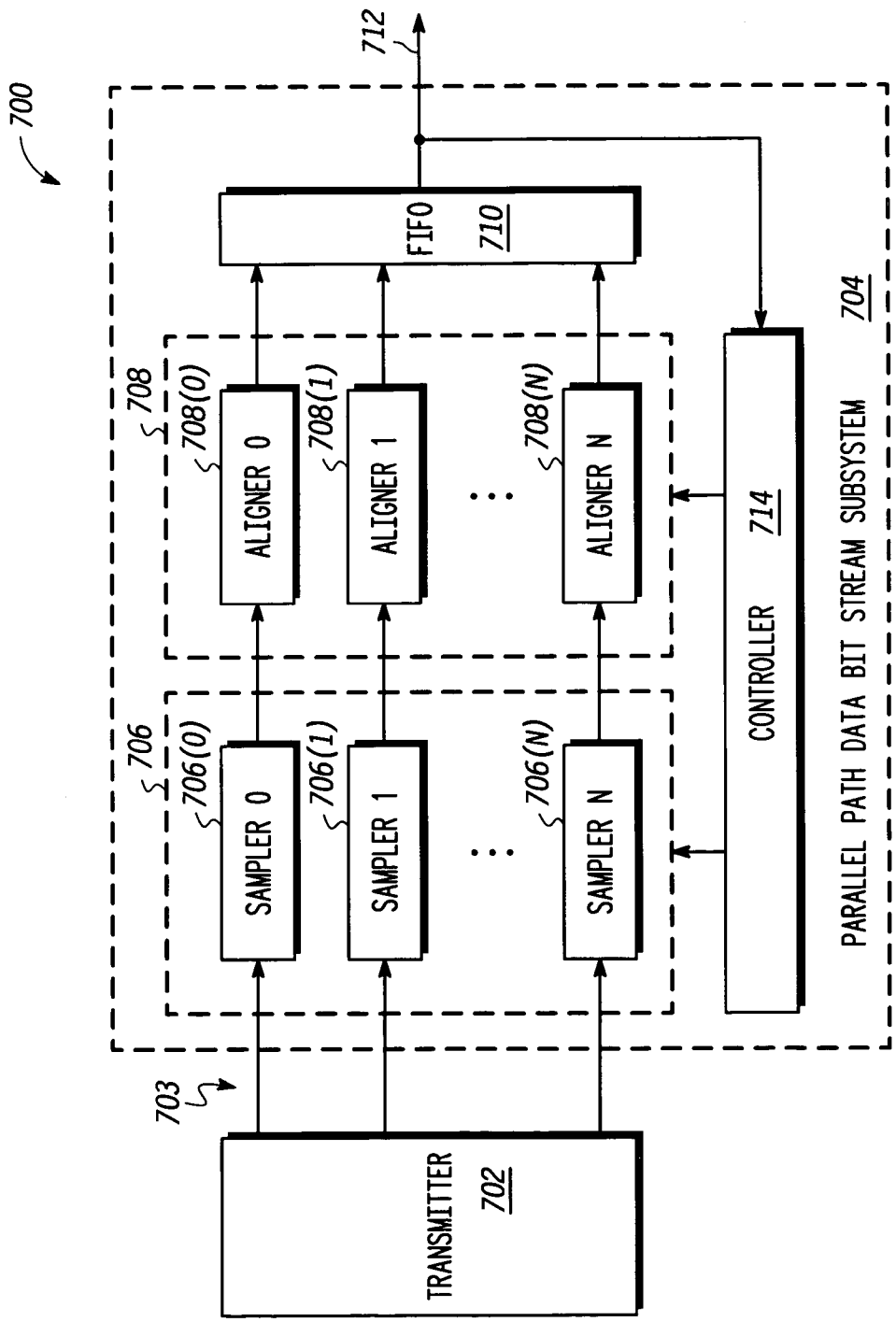
FIG. 7 is a block diagram view of a parallel path alignment module according to an embodiment of the present disclosure.

FIG. 7 is a block diagram view of a parallel path alignment module 700 according to an embodiment of the present disclosure. The parallel path alignment module 700 operates in connection with a transmitter 702. Transmitter 702 outputs a high speed parallel data stream on output data IO lines 703, the data stream including, for example, a frame bit (or special designated data bit) and associated data bits. In addition, the parallel path alignment module 700 comprises a parallel IO endpoint subsystem 704. The parallel IO endpoint subsystem 704 includes a number "n" of sampler units 706(0), 706(1), . . . , 706(n) coupled to a corresponding number "n" of aligner units 708(0), 708(1), . . . , 708(n), wherein n is an integer number of data IO lines (or outputs) of transmitter 702. The n aligner units 708(0), 708(1), . . . , 708(n) are coupled to a register 710, such as a FIFO register. The FIFO register 710 outputs parallel aligned data on output bus 712. The parallel IO endpoint subsystem 704 further includes a controller 714. Controller 714 comprises any suitable controller for providing appropriate enable/disable and other control signals to sampler units 706 and aligner units 708 according to the embodiments of the present disclosure. Controller 714 also provides one of training control, alignment control, or a combination of training control and alignment control as may be needed for carrying out the alignment methods of the present disclosure, furthermore according to the requirements of a particular parallel data stream alignment application. Responsive to the high speed parallel data stream of data bits received from transmitter 702, the parallel IO endpoint subsystem 704 provides parallel aligned data on output 712.

Figure 8:
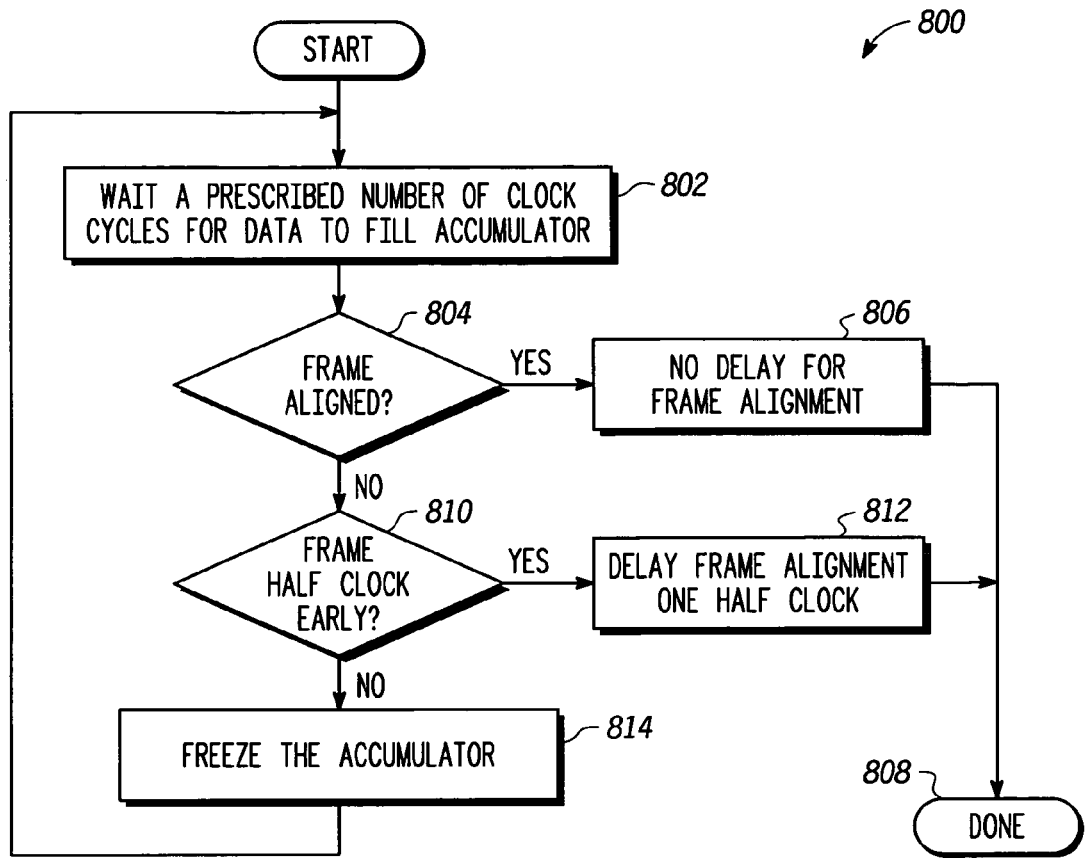
FIG. 8 is a flow diagram view of a method for training the parallel path alignment implementation according to an embodiment of the present disclosure.

FIG. 8 is a flow diagram view 800 of a method for training the parallel path alignment implementation according to an embodiment of the present disclosure. In RapidIO, there is a frame bit and 8 data bits. The frame bit is used as a control bit. The implementation according to one embodiment of the present disclosure aligns the frame bit to the clock such that an 8-bit training pattern appears correctly in the accumulator, and then aligns all of the data bits to the frame bit. Note that, in the absence of the frame bit, any of the data bits could be used for the initial alignment.

In the embodiment of FIG. 8, for a particular parallel path alignment implementation, the alignment method is initially trained using a frame training pattern suitable for aligning a frame bit to the clock. After frame bit alignment begins, the alignment method waits eight clocks for data from newly selected sample points to fill the accumulator (Step 802). A comparison follows (Step 804). If the frame (i.e, frame training pattern) is perfectly aligned, then the frame alignment completes with the frame bit requiring no delay (Steps 806 and 808). On the other hand, if the comparison result in step 804 indicated that the frame was not aligned, then the method proceeds to step 810. In step 810, the method queries whether the frame training pattern is a half-clock early. If the frame training pattern is half a clock cycle early, then delay the frame a half clock cycle and the aligner method is done (Steps 812 and 808). On the other hand, if the comparison result in step 810 indicated that the frame was not a half-clock early, then the method proceeds to step 814. In other words, if the pattern in the accumulator is neither an exact match, nor a match shifted one-half clock early, then freeze the accumulator counter for one clock (Step 814). This is the equivalent of delaying the frame pattern by one clock cycle. In this manner, the frame pattern can be shifted in time relative to the accumulator until it is determined that the frame bit is exactly lined up with the clock or a half cycle early.

Further in connection with the embodiment of FIG. 8, each time the accumulator is frozen, the alignment method waits eight clocks before doing another comparison in order to allow the accumulator to fill with data using the "new" alignment. That is, in order to flush the accumulator so that data with the "new" alignment is available for testing, it is necessary for the alignment process to wait eight clocks. In this instance, the number 8 simply represents the number needed for the particular training pattern used in a RapidIO implementation. Accordingly, during frame alignment, the two goals of the alignment method are to determine whether the frame bit needs to be delayed by half a clock cycle or not, and to align the frame bit with the accumulator so that when the accumulator gets eight frame bits, those frame bits are the same as training pattern without requiring any shifts. That is, bit 0 of the training pattern is bit 0 of the accumulator.

An initial bit alignment algorithm provides for the initial alignment of each data bit to the frame bit. Once the frame bit is aligned, all of the data bits are initially given the frame bit's alignment. Accordingly, when a data bit is compared to a corresponding bit of the training pattern, if it matches exactly, then it keeps the same alignment. On the other hand, if the bit is half a clock early, then the data bit must be delayed half a clock more than the frame bit. That is, if the frame bit is not delayed, the data bit is delayed half a clock. If the frame bit is delayed half a clock, then the data bit is delayed a full clock. If the data bit is a half clock late, then it must be delayed half a clock less than the frame bit. So, if the frame bit is delayed half a clock, the data bit is not delayed at all. But if the frame bit is not delayed, special handling is required since the data bit can't be delayed into the future. The situation is resolved by delaying the frame bit a full clock and the data bit a half clock. The frame bit is delayed by a full clock so it remains properly aligned with the rising edge of the clock. This solution requires that all bits come at the same time, half a clock later, or a full clock later than the frame bit. If any data bits arrive prior to the frame bit, an error is reported since this would require such a data bit to be delayed more than one clock cycle. While such large delays could be implemented, they were not required for this application.

Furthermore, if the frame bit is delayed half a clock, then no final alignment is necessary. The various data bits can be delayed zero, one half, or one full clock cycle and all the bits will be aligned properly. This allows data bits to be half a clock ahead or behind the frame bit and up to a full clock ahead or behind other data bits.

Accordingly, the alignment methodology addresses an issue that is not addressed in normal Double Data Rate (DDR) designs. Such DDR designs, especially DDR memories, guarantee that there is at least a portion of the clock cycle where all of the data bits are valid. Some DDR interfaces even specify where in the data cycle that point will be. Unfortunately, there is no guarantee of such an area under the RapidIO standard. The alignment methodology therefore provides significantly more tolerance for skew than common methods. Furthermore, the alignment methodology allows integrated circuit chips to be designed to looser tolerances; that is, on-chip skew does not have to be so tightly controlled in order to still align successfully.

Figure 9:
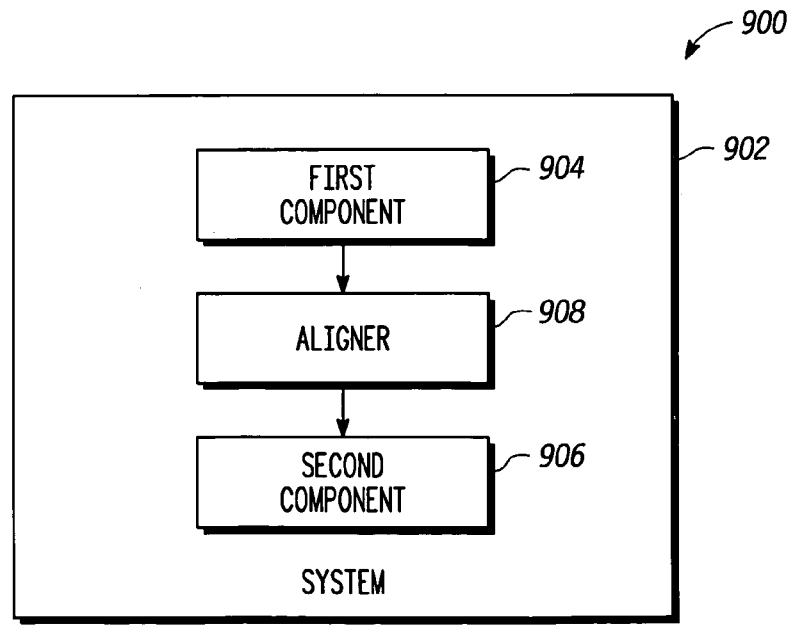
FIG. 9 is a block diagram view of a system incorporating a parallel path alignment module according to an embodiment of the present disclosure.

FIG. 9 is a block diagram view of a system 900 incorporating a parallel path alignment module according to an embodiment of the present disclosure. System 900 comprises a system module 902 that includes a first component 904, a second component 906, and an aligner component 908. The first component 904 (for example, a transmitter) outputs a high speed parallel data stream to the aligner 908. The high speed parallel data stream includes data synchronized on clock edges. Aligner 908 includes an alignment module according to the embodiments of the present disclosure as described and discussed herein above with respect to the embodiments of FIGS. 3-7. Accordingly, aligner 908 is responsive to the high speed parallel data stream for eliminating any skew contained therein and providing parallel aligned data on its output. The output of aligner 908 is input to the second component 906. Aligner 908 and the second component 906 are proximate one another within system 902, such that the parallel path alignment of data is maintained with no additional skew introduced therein. The second component 906 uses the parallel path aligned data for the intended purpose of the second component.

As described herein, the embodiments solve the problem of high speed parallel data stream mis-alignment in several new ways. First, the parallel output data requires no multiplexing (also referred to herein as muxing). This is important since the alignment circuit outputs are part of a critical path. As a result, a cycle of latency was avoided. Second, the new method uses smaller multiplexors (2-to-1 rather than 3-to-1) and these multiplexors are used to create a delay element that can be skipped or can be used to delay the data by one half clock cycle or by a full clock cycle. Third, the new method is more easily extendible to allow greater skew tolerance. Furthermore, the old methodology would require wider muxes while the new methodology would require the muxes to grow more slowly. Fourth, all but two of the flip-flops per bit in the new design switch at half the frequency of the corresponding flip-flops in the prior art. Overall, the new method is simpler, easier to design and understand, and has fewer critical path problems. The embodiments of the present disclosure further provide a design that is applicable for use as a parallel RapidIO endpoint. Such endpoints can be implemented for a wide variety of integrated circuit chips, including processors, systems on a chip, networking integrated circuit chips, etc.

As discussed herein, the method according to the embodiments of the present disclosure use 2-to-1 multiplexors, while the prior known method requires 3-to-1 multiplexors. In addition, the method according to the embodiments of the present disclosure can accommodate larger skew tolerance more easily than that of the prior known method. In the prior methodology, more skew tolerance would require shift registers to add two (2) flip-flops per additional clock of allowed skew and the muxes would each grow two bits wider. In other words, to allow for up to two (2) clock periods of skew, the prior known method would require five-to-one (5-to-1) muxes. Furthermore, note that those 5-to-1 muxes would reside on critical paths. However, the method according to the present disclosure remains simpler. That is, for each additional clock of skew tolerance, two (2) flip-flops would be added but the new multiplexors would have only one more input than a prior stage. In other words, to allow for up to two (2) clock periods of skew, the new method would require four 2-to-1 muxes and two 3-to-1 muxes. While the number of muxes has increased with the new method, the muxes themselves remain much smaller and, more importantly, they remain on non-critical paths. Accordingly, the embodiments of the present disclosure can be configured to allow for one or more skew of 0, 0.5, 1.0, 1.5, 2.0, etc. In other words, sampled P and N data can be delayed by one of zero, one-half, one, or other multiple of one-half clock cycle.

According to one embodiment of the present disclosure, the method includes aligning parallel data streams, for example, so that all bits of a byte appear together at the expected time. Such a method can be used anywhere individual bits are received with skews large enough to cause misalignment. Most notably, skew can likely occur on high-speed connections with two, or more, bits in parallel.

The embodiments advantageously enable a gain in skew tolerance on high-speed parallel interfaces to be obtained.

According to another embodiment of the present disclosure, the alignment method makes use of delaying data entering into an accumulator. As a result, the alignment method eliminates the multiplexing between the accumulator and the downstream logic. The alignment method thus includes a delay in noncritical locations, that is, outside of a critical path. The alignment method is simpler to implement, requiring smaller muxes and less interconnect, in addition that the method generalizes easily for larger accumulators or skew. For example, the alignment method works for correcting skew that is on the order of up to two or more bit times.

As discussed herein, the embodiments of the present disclosure are applicable to high-speed parallel data stream interfaces. As technologies get faster, the embodiments of the present disclosure can also be used to meet more aggressive timing requirements in those faster technologies. In addition, benefits that can be obtained from the embodiments of the present disclosure include improved yield due to additional slack in critical path, easier to understand design method, less area since the required devices are smaller, and easier to modify to allow greater skew or larger accumulator size. Furthermore, the embodiments permit larger on-chip skew, therefore, the embodiments are easier to layout and the logic between pads and samplers are less critical.

Furthermore, the embodiments of the present disclosure advantageously enable a way to align two separate receivers, wherein the two receivers are being used to form a 16-bit interface, rather than two 8-bit interfaces. Achieving such an alignment is simple with use of the basic alignment technique used for each receiver, wherein the technique for aligning the bits of a single 8-bit receiver has been discussed herein. As a result, a two-receiver alignment requirement is much more easily incorporated than might otherwise be expected, without adding any latency or additional buffering.

In the foregoing specification, the disclosure has been described with reference to the various embodiments. However, one of ordinary skill in the art appreciates that various modifications and changes can be made without departing from the scope of the present embodiments as set forth in the claims below. Accordingly, the specification and figures are to be regarded in an illustrative rather than a restrictive sense, and all such modifications are intended to be included within the scope of the present embodiments. For example, the present embodiments can apply to any parallel high speed data stream endpoints for a wide variety of integrated circuit chips, including, processors, systems on a chip, networking integrated circuit chips, etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the term "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for aligning parallel path data bit streams that may contain skewed data between bit streams, the method comprising for each bit stream:
   sampling P data presented on a positive edge of a clock;
   sampling N data presented on a negative edge of the clock; and
   delaying the sampled P and N data by one of zero, one-half, one, or other multiple of one-half clock cycle, wherein delaying the sampled P and N data by one of zero, one-half, one, or other multiple of one-half clock cycle is selected to remove any skew and aligns the sampled P and N data between bit streams, wherein delaying includes using first and second 2-to-1 multiplexors in conjunction with first and second flip-flops for providing inputs to third and fourth 2-to-1 multiplexors, wherein the third and fourth 2-to-1 multiplexors output the sampled P and N data to four register flip-flops in a sequential order, the sampled P and N data having been delayed by one of zero, one-half, or one clock cycle.

2. The method of claim 1, wherein the clock comprises an endpoint state clock for a digital locked loop (DLL).

3. The method of claim 1, further wherein the first and second 2-to-1 multiplexors include a first control input and the third and fourth 2-to-1 multiplexors include a second control input, wherein responsive to (i) asserting a half-clock cycle control signal on the first and second control inputs, the first, second, third, and fourth 2-to-1 multiplexors operate to implement a one-half clock cycle delay and wherein responsive to (ii) asserting a full clock cycle control signal on the second control input, the first, second, third, and fourth 2-to-1 multiplexors operate to implement a full clock cycle delay.

4. The method of claim 3, further wherein asserting the half-clock cycle control signal and asserting the full clock cycle are mutually exclusive.

5. The method of claim 3, further wherein responsive to (iii) asserting no control signal on the first and second control inputs, the first, second, third, and fourth 2-to-1 multiplexors operate to implement no clock cycle delay.

6. The method of claim 1, further wherein (i) loading of new data or (ii) maintaining of current data in the register flip-flops is controlled in response to an enable signal asserted on an enable control input of the register flip-flops.

7. The method of claim 1, wherein the register flip-flops include an enable input.

8. The method of claim 1, further comprising disabling the first two flip-flops in response to a zero clock cycle delay, corresponding to when neither a half-clock cycle or a full-clock cycle delay is required.

9. The method of claim 1, wherein the clock comprises an endpoint state clock for a digital locked loop (DLL), and wherein the P data and N data comprise double data rate (DDR) data that is received every one-half clock cycle, corresponding to either of the positive and negative edges of the endpoint clock.

10. The method of claim 1, further comprising:
   loading the delay outputs, in parallel, into an output register.

11. The method of claim 1, further comprising:
   loading a set of registers in parallel with delayed N and P data until the set of registers become full; and
   transferring aligned P and N data bits out of the set of registers in response to the filling of the set of registers.

12. An integrated circuit with a feature for aligning parallel path data bit streams that may contain skewed data between bit streams, comprising:
  means for sampling P data presented on a positive edge of a clock for a given bit stream;
  means for sampling N data presented on a negative edge of the clock for the given bit stream; and
  means for delaying the sampled P and N data of the given bit stream by one of zero, one-half, one, or other multiple of one-half clock cycle, wherein responsive to a control input, said delaying means delays the sampled P and N data by one of zero, one-half, one, or other multiple of one-half clock cycle to remove any skew and align the sampled P and N data between bit streams, wherein said delaying means includes first and second 2-to-1 multiplexors used in conjunction with first and second flip-flops for providing inputs to third and fourth 2-to-1 multiplexors, wherein the third and fourth 2-to-1 multiplexors output the sampled P and N data to four register flip-flops in a sequential order, the sampled P and N data having been delayed by one of zero, one-half, or one clock cycle.

13. The integrated circuit of claim 12, further wherein the first and second 2-to-1 multiplexors include a first control input and the third and fourth 2-to-1 multiplexors include a second control input, wherein responsive to (i) asserting a half-clock cycle control signal on the first and second control inputs, the first, second, third, and fourth 2-to-1 multiplexors operate to implement a one-half clock cycle delay and wherein responsive to (ii) asserting a full clock cycle control signal on the second control input, the first, second, third, and fourth 2-to-1 multiplexors operate to implement a full clock cycle delay.

14. The integrated circuit of claim 13, further wherein responsive to (iii) asserting no control signal on the first and second control inputs, the first, second, third, and fourth 2-to-1 multiplexors operate to implement no clock cycle delay.

15. The integrated circuit of claim 12, further wherein (i) loading of new data or (ii) maintaining of current data in the register flip-flops is controlled in response to an enable signal asserted on an enable control input of the register flip-flops.

* * * * *